US011655196B2

(12) United States Patent
Abu-Rabeah et al.

(10) Patent No.: US 11,655,196 B2
(45) Date of Patent: May 23, 2023

(54) GRANULES OF POLYHALITE AND UREA

(71) Applicant: ICL EUROPE COOPERATIEF U.A., Amsterdam (NL)

(72) Inventors: Khalil Abu-Rabeah, Beer Sheva (IL); Natalia Geinik, Arad (IL)

( * ) Notice: Subject to any disclaimer, the term of this patent is extended or adjusted under 35 U.S.C. 154(b) by 0 days.

(21) Appl. No.: 17/620,132

(22) PCT Filed: Aug. 24, 2020

(86) PCT No.: PCT/IL2020/050922
§ 371 (c)(1),
(2) Date: Dec. 17, 2021

(87) PCT Pub. No.: WO2021/059261
PCT Pub. Date: Apr. 1, 2021

(65) Prior Publication Data
US 2022/0259115 A1    Aug. 18, 2022

Related U.S. Application Data

(60) Provisional application No. 62/904,771, filed on Sep. 24, 2019.

(51) Int. Cl.
| | | |
|---|---|---|
| C05G 1/00 | (2006.01) | |
| C05G 5/12 | (2020.01) | |
| C05G 5/30 | (2020.01) | |
| C05C 3/00 | (2006.01) | |
| C05C 9/00 | (2006.01) | |
| C05D 1/00 | (2006.01) | |
| C05D 1/02 | (2006.01) | |

(52) U.S. Cl.
CPC ............... C05G 1/00 (2013.01); C05C 3/005 (2013.01); C05C 9/005 (2013.01); C05D 1/005 (2013.01); C05D 1/02 (2013.01); C05G 5/12 (2020.02); C05G 5/30 (2020.02)

(58) Field of Classification Search
None
See application file for complete search history.

(56) References Cited

U.S. PATENT DOCUMENTS

| | | | | |
|---|---|---|---|---|
| 5,630,861 | A  * | 5/1997 | Yaniv ....................... | C05G 5/40 |
| | | | | 71/33 |
| 9,078,393 | B1 * | 7/2015 | Polizotto ................... | A01G 7/00 |
| 2004/0120867 | A1 * | 6/2004 | Dahms ....................... | C05B 7/00 |
| | | | | 422/184.1 |
| 2006/0063674 | A1 * | 3/2006 | Morris, Jr. ................ | C05G 5/14 |
| | | | | 504/101 |
| 2009/0163365 | A1 * | 6/2009 | Bentlage ................. | C08F 220/06 |
| | | | | 524/211 |
| 2010/0275664 | A1 * | 11/2010 | Windhoevel ............. | C05G 5/40 |
| | | | | 71/27 |
| 2019/0241478 | A1 * | 8/2019 | Banik ....................... | C05G 5/12 |
| 2019/0308916 | A1 * | 10/2019 | Zhang ....................... | C05G 3/44 |
| 2020/0095175 | A1 * | 3/2020 | Losic ........................ | C05G 5/12 |
| 2020/0157015 | A1 * | 5/2020 | Albright .................... | C05G 5/12 |

FOREIGN PATENT DOCUMENTS

| | | | | |
|---|---|---|---|---|
| CA | 3066985 | A1 | 12/2018 | |
| EP | 1230197 | | 8/2002 | |
| GB | 2544340 | * | 5/2017 | ............... C05C 9/00 |
| WO | 2015066691 | A1 | 5/2015 | |
| WO | WO 2015/066691 | A1 * | 5/2015 | ............ A01N 25/00 |
| WO | 2017081470 | | 5/2017 | |
| WO | 2018107212 | A1 | 6/2018 | |
| WO | 2018229757 | | 12/2018 | |
| WO | 2020064036 | | 4/2020 | |

OTHER PUBLICATIONS

Office Action issued in Israel Patent App. No. IL288660, dated May 18, 2022, 5 pages.

O. Dormeshkin. Mauritius, Interactions between components of complex fertilizers. Chemical and physico-chemical interactions at the stages of mixing, granulating and drying during their production, LAP Lambert Academic Publishing, 2019. Published on: Feb. 13, 2019 URL: https://elib.belstu.by/handle/123456789/28144 ISBN: 978-613-9-45198-2 https://www.morebooks.de/store/gb/book/interactions-between-components-of-complex-fertilizers/isbn/978-613-9-45198-2.

* cited by examiner

*Primary Examiner* — Wayne A Langel

(74) *Attorney, Agent, or Firm* — Alphapatent Associates, Ltd; Daniel J. Swirsky

(57) ABSTRACT

There is provided herein a fertilizer granule comprising Urea, Polyhalite and Ammonium Sulphate.

10 Claims, No Drawings

GRANULES OF POLYHALITE AND UREA

FIELD OF THE INVENTION

The present invention relates to the field of fertilizers, specifically to production of granulation of Urea and Polyhalite as a fertilizer.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these 1.0 can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:
Nitrogen (N): leaf growth;
Phosphorus (P): Development of roots, flowers, seeds, fruit;
Potassium (K): Strong stem growth, movement of water in plants,
promotion of flowering and fruiting;
three secondary macronutrients: calcium (Ca), magnesium (Mg), and Sulphur (S); micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Polyhalite is an evaporite mineral, a hydrated sulfate of potassium, calcium and magnesium with formula: $K_2Ca_2Mg(SO_4)_4 \cdot 2H_2O$. Polyhalite is used as a fertilizer since it contains four important nutrients and is low in chloride:
48% $SO_3$ as sulfate
14% $K_2O$
6% $MgO$
17% $CaO$ Nitrogen is essential component for the plant. N containing fertilizers like Urea, ammonium nitrate, ammonium sulphate calcium nitrate and Magnesium nitrate are useful for the plant's growth.

Urea, also known as carbamide, is an organic compound with chemical formula $CO(NH_2)_2$. This amide has two —$NH_2$ groups joined by a carbonyl(C=O) functional group.

Polyhalite and urea, although both useful for the proper growth of a plant are practically un-mixable due to urea is considered a ductile material, and polyhalite is a mined non-ductile substance. From a chemical point of view it is extremely difficult of cause the adherence of these two substances without using shear force as these are both solids.

WO2017081470 discloses a fertiliser pellet comprising: a first region of a nitrogen-providing fertiliser composition; and a second region adhered to the exterior of the first region, the second region comprising a fertiliser composition capable of providing (a) two or more alkali metal and/or alkaline earth metal nutrients and (b) Sulphur.

However, WO2017081470, being aware of the difficulties to adhere urea and polyhalite together only teaches a process of coating polyhalite on top of a core comprising the urea.

SUMMARY OF THE INVENTION

According to some demonstrative embodiments, there is provided herein a fertilizer granule comprising Urea, Polyhalite and Ammonium Sulphate.

According to some demonstrative embodiments, the granule may include a core and one or more coating layers.

According to some embodiments, the Urea, Polyhalite and Ammonium Sulphate may be contained in the core.

According to some embodiments, the granule may further include potash, magnesite and clay.

According to some embodiments, the Potash may be in the form of Muriate of Potash (MOP).

According to some embodiments, the urea may be present in a concentration of 40-50% w/w, preferably 45% w/w, of the weight of the granule, the Polyhalite may be present in the concentration of 15-30% w/w, preferably, 23% w/w, of the weight of the granule and the Ammonium Sulphate may be present in a concentration of 5-15% w/w, preferably 10% w/w, of the weight of the granule.

According to some embodiments, the strength of the granule of the present invention may be 3.8 KgF/Granule when measured after production.

According to some embodiments, the particle size distribution (PSD) of the granule of the present invention may be 2.0-4.75 mm.

According to some demonstrative embodiments, there is provided herein a process for the granulation of Polyhalite and urea, wherein the process may include reacting Ammonia with sulfuric acid, thereby causing a chemical reaction that melts urea.

According to some embodiments, the process may include:
mixing a feed of Polyhalite with a feed of urea, magnesite, clay and the acidic compound to yield a mixture.
Adding Ammonia to the mixture which causes a chemical reaction between the Ammonia and the sulfuric acid to yield an exothermic reaction with elevated temperatures (exceeding 110 Degrees Celsius). This exothermic reaction causes melting of the urea, thereby providing a mixture with melted urea;
Granulating the mixture with the melted urea in a drum granulator to yield particle masses;
Screening said particle masses in a screener to yield different fractions in three different sizes: Oversized particles which undergo a crushing process and are returned to the granulator as recycle, desired size granular particles which are transferred to coating and fine particle which are transferred back to the granulator.

DETAILED DESCRIPTION OF THE INVENTION

According to some demonstrative embodiments, there is provided herein a fertilizer granule comprising Urea, Polyhalite and Ammonium Sulphate.

According to some demonstrative embodiments, the term "fertilizer" may include any material of natural or synthetic origin that may be applied to soils or to plant tissues to supply one or more plant nutrients essential to the growth of plants, including, for example, Single nutrient ("straight") fertilizers such as Ammonium nitrate, Urea, calcium ammonium nitrate, superphosphate, e.g., "Single superphosphate" (SSP), phosphogypsum, Triple superphosphate (TSP) or a mixture thereof; Multinutrient fertilizers such as Binary (NP, NK, PK) fertilizers, e.g., monoammonium phosphate (MAP) and/or diammonium phosphate (DAP), NPK fertilizers which are three-component fertilizers providing nitrogen, phosphorus, and potassium; fertilizers which include one or more of the main micronutrients sources of iron, manganese, boron, molybdenum, zinc, and copper and the like; Compound fertilizers, e.g., which contain N, P, and K; Organic fertilizers such as peat, animal wastes, plant wastes from agriculture, and sewage sludge; and/or Other elements such as calcium, magnesium, and sulfur.

According to some demonstrative embodiments, there is provided herein a fertilizer granule comprising Urea, Polyhalite and Ammonium Sulphate, wherein the Urea, Polyhalite and Ammonium Sulphate are mixed together.

According to some demonstrative embodiments, the fertilizer granule may comprise a core and one or more coating layers. According to some embodiments, the core may comprise Urea, Polyhalite and Ammonium Sulphate.

According to some embodiments, the granule may further include potash, magnesite and clay.

Magnesite allows for the presence of magnesium in the final product, wherein magnesium is beneficial for the growth of the plant.

According to some demonstrative embodiments, the clay may be present in a concentration of 5-20% w/w, preferably 15% w/w, of the weight of the granule, According to some demonstrative embodiments, the magnesite may be present in a concentration of 0.5-3% w/w, preferably 1% w/w, of the weight of the granule.

According to some demonstrative embodiments, the granule of the present invention may also include a conditioning agent. According to some embodiments, the conditioning agent may be present in a concentration of 1-5% w/w of the weight of the granule.

According to some embodiments, the Potash may be in the form of Muriate of Potash (MOP). Muriate of potash, also known as potassium chloride contains 60% potash may preferably be used to correct the $K_2O$.

According to some embodiments, the urea may be present in a concentration of 40-50% w/w, preferably 45% w/w, from the weight of the granule, the Polyhalite may be present in the concentration of 15-30% w/w, preferably, 23% w/w, from the weight of the granule and the Ammonium Sulphate may be present in a concentration of 5-15% w/w, preferably 10% w/w, from the weight of the granule.

According to some embodiments, the strength of the granule of the present invention may be 3.8 KgF/Granule when measured after production.

According to some embodiments, the particle size distribution (PSD) of the granule of the present invention may be 2.0-4.75 mm.

According to some demonstrative embodiments, there is provided herein a process for the granulation of Polyhalite and urea, wherein the process may include exposing urea Ammonia and an acidic component, e.g., sulphoric acid, thereby causing a chemical reaction forming ammonium slats.

According to some embodiments, the process may include:
mixing a feed of Polyhalite with a feed of urea, magnesite, clay and sulfuric acid to yield a mixture.
Adding Ammonia to the mixture which causes a chemical reaction melting the urea, thereby providing a mixture with melted urea;
Granulating the mixture with the melted urea in a drum granulator to yield particle masses;
Screening said particle masses in a screener to yield different fractions in three different sizes: Oversized particles which undergo a crushing process and are returned to the granulator as recycle, desired size granular particles which are transferred to coating and fine particle which are transferred back to the mixture.

According to some demonstrative embodiments, the present invention allows for the effective granulation of polyhalite and urea.

According to some embodiments, the process of the present invention allows for a chemical melting of the urea, resulting in the effective adherence of urea to polyhalite within the resulting granule.

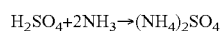

$H_2SO_4 + 2NH_3 \rightarrow (NH_4)_2SO_4$

According to some embodiments, oil may be added to the resulting granules, e.g., to improve the rheology of the product and diminish dust formation. For example in an amount anti caking agent, coating agent can be added. According to some embodiments, any suitable oil may be used, including for example, mineral oil or similar, slack wax or similar, paraffin wax or similar or mixture of them According to these embodiments, in wet granulation the process includes the following steps:
Mixing urea, Polyhalite, magnesite, clay sulfuric acid and water at room temperature; ammonia was added to produce ammonium sulphate. According to these embodiments the reaction between sulfuric acid and ammonia emitted heat that melt part of the Urea.
Feeding the mixture into a granulator to provide wet granules; drying of the granules, sieving of the granules.

According to some embodiments, after sieving there are three types of yield:
1. Desired sized granules—from 2 to 4.75 mm
2. Oversized (OS) granules—are returned to the grinding stage, e.g., between 4-20% of the yield.
3. Undersized (US) flakes—are returned to the granulation.
4. according to some embodiment anticaking agent is added.

According to some embodiments, the nutrients may include:
Nitrogen (N): leaf growth;
Potassium (K): Strong stem growth, movement of water in plants, promotion of flowering and fruiting.
Three secondary macronutrients: calcium (Ca), magnesium (Mg), and sulphur (S);
micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

According to some embodiments, the mixture of the present invention may also include additional fertilizer besides urea, ammonium salts and Polyhalite According to some demonstrative embodiments, the sieving is done using a sieve having opening with a diameter of between 1.4-4.75 mm preferably between 2-475. mm.

According to some embodiments, the mixing is may performed in a blade blender and/or any other suitable devise capable of having a rotation speed that creates a swirling motion for a perfect homogenization and a high blending.

According to some embodiments the resulting granules may be further coated with a suitable coating. For example, the coatings may include biodegradable coatings, sustained release coatings, controlled release coatings, oily coatings, wax coatings, starch coating anticaking agent.

The resulting mixture may include the following properties as detailed in table 1

TABLE 1

| Raw Material | % | N-TOTAL % | K2O % | SO4 % | Ca % | Mgo % |
|---|---|---|---|---|---|---|
| Urea | 45 | 46 | | | | |
| Polyhalite | 23 | | 13 | 56.4 | 12.2 | 5.6 |
| Ammonium Sulphate | 10 | 21 | | 73 | | |
| MOP | 3 | | 60 | | | |
| Magnesite | 1 | | | | | 85 |
| Clay | 15 | | | | | |
| Water | 1 | | | | | |
| Anticaking Agent | 1 | | | | | |
| Total | 100 | 22.9 | 5.0 | 20.5 | 2.8 | 2 |

Example-1

Feed

| Materials | Feed rate (ton/h) | Ratio (%) |
|---|---|---|
| Polysulphate | 230 | 23.3 |
| Urea | 447 | 45.2 |
| Ammonium Sulphate | 100 | 10.1 |
| MOP | 33 | 3.3 |
| Magnesite | 8 | 0.8 |
| Clay | 150 | 15.2 |
| Anticaking agent | 10 | 1 |
| Water | 10 | 1 |

The urea, Polyhalite, ammonium sulphate, potash, magnesite, clay conditioning agent and water were mixed and transfer to drum granulator The following conditions were set:

| Parameter | Value/ |
|---|---|
| Order of feeding material | All together |
| Pre-mixing | blunger mixer |
| adding ammonia | . |
| Water % | 7% moisture in bed |
| Granulator Type | rotary |
| Granulation Speed | 12.5 rpm |
| Diameter of Granulator | 2.50 m |
| Granulation Temperature | 70 C. |
| Retention Time Granulator | Abt 3 min. |
| Retention Time Drying | Abt 20 min |
| Dryer Type | rotary |
| Drying Temp | Product exit 70 C. |
| Recycle Ratio | 2:1 |
| Curing time | Min 5 days |

The Product Composition

| Element | concentration | Unit |
|---|---|---|
| Total N | 23.8 | % |
| SO4 | 20.5 | % |
| K2O | 5 | % |
| Ca | 2.8 | % |
| MgO | 2 | % |
| Cl | 5.5 | % |
| Insol | 15.9 | % |
| H$_2$O | 3.7 | % |
| pH | 6.5 | |

The product was kept in pile at ambient condition. Quality after Month of Production

| | Value | Unit |
|---|---|---|
| Strength | 3.8 | Kg/granule |
| Abrasion -12 mesh | 0.88 | % |
| Abrasion -32 mesh | 0.35 | % |
| Abrasion -100 mesh | 0.22 | % |
| Eco Dust | 0.09 | % |

While this invention has been described in terms of some specific examples, many modifications and variations are possible. It is therefore understood that within the scope of the appended claims, the invention may be realized otherwise than as specifically described.

The invention claimed is:

1. A fertilizer granule comprising Urea, Polyhalite and Ammonium Sulphate contained in a core of said granule.

2. The granule of claim 1, wherein said Urea is present in a concentration of 40-50% w/w of the weight of the granule, said Polyhalite is present in the concentration of 15-30% w/w of the weight of the granule and said Ammonium Sulphate is present in a concentration of 5-15% w/w of the weight of the granule.

3. The granule of claim 2, wherein said urea is present in a concentration of 45% w/w of the weight of the granule, said Poly halite is present in the concentration of 23% w/w of the weight of the granule and said Ammonium Sulphate is present in a concentration of 10% w/w of the weight of the granule, introduced as ammonia and sulfuric acid.

4. The granule of claim 3 wherein the strength of said granule is 3.8 KgF/Granule when measured after production.

5. The granule of claim 4, wherein the particle size distribution of said granule is 2.0-4:75 mm.

6. The granule of claim 1, further comprising potash, magnesite and clay.

7. The granule of claim 6, wherein said Potash is in the form of Muriate of Potash (MOP).

8. The granule of claim 1, comprising one or more coating layers.

9. A process for the production of a fertilizer comprising:
   mixing a feed of Polyhalite with a feed of urea, magnesite, clay and sulfuric acid to yield a mixture;
   adding Ammonia to the mixture which causes a chemical reaction between the Ammonia and the sulphuric acid to yield an exothermic reaction causing melting of the urea, thereby providing a mixture with melted urea;
   granulating the mixture with the melted urea in a drum granulator to yield particle masses; and
   screening said particle masses in a screener to yield different fractions in three different sizes: Oversized particles (above 4.75 mm) which undergo a crushing process and are returned to the granulator as recycle, desired size granular particles (from 2 to 4.75 mm), and fine particles (below 2 mm) which are transferred back to the mixture.

10. The process of claim 9; wherein said exothermic reaction exceeds 130 Degrees Celsius.

\* \* \* \* \*